United States Patent [19]

Sehgal

[11] Patent Number: 4,572,677
[45] Date of Patent: Feb. 25, 1986

[54] VIBRATION DAMPED PROBE

[75] Inventor: Tyag R. Sehgal, Cincinnati, Ohio

[73] Assignee: General Electric Company, Cincinnati, Ohio

[21] Appl. No.: 575,366

[22] Filed: Jan. 30, 1984

[51] Int. Cl.[4] .................. G01K 1/14; G01K 13/02
[52] U.S. Cl. .................... 374/144; 136/230; 374/166; 374/208
[58] Field of Search .......... 374/117, 144, 166, 179, 374/110; 136/230

[56] References Cited

U.S. PATENT DOCUMENTS

| | | | |
|---|---|---|---|
| 2,660,883 | 12/1953 | Wyczalek | 374/144 X |
| 2,756,596 | 7/1956 | Nelson et al. | 374/144 |
| 3,100,985 | 8/1963 | Wells | 374/110 X |
| 3,913,058 | 10/1975 | Nishio et al. | 374/144 X |
| 3,923,552 | 12/1975 | Parris | 374/179 X |
| 3,939,012 | 2/1976 | Williams | 136/230 X |
| 3,955,419 | 5/1976 | Barton et al. | 374/166 |
| 4,440,508 | 4/1984 | Haloburbo, Jr. et al. | 374/179 |

Primary Examiner—Daniel M. Yasich
Attorney, Agent, or Firm—Gregory A. Welte; Derek P. Lawrence

[57] ABSTRACT

The present invention includes a pair of cantilevered probes. A first fastening means is fastened to a first of the probes and is loosely journaled about the second probe. A second fastening means is fastened to the second probe and is loosely journaled about the first probe. The invention provides improved resistance to the harmful effects of vibration.

1 Claim, 5 Drawing Figures

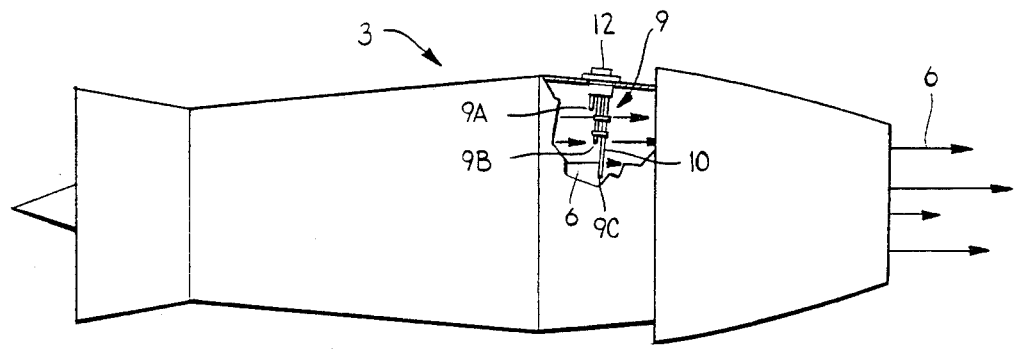
Fig 1
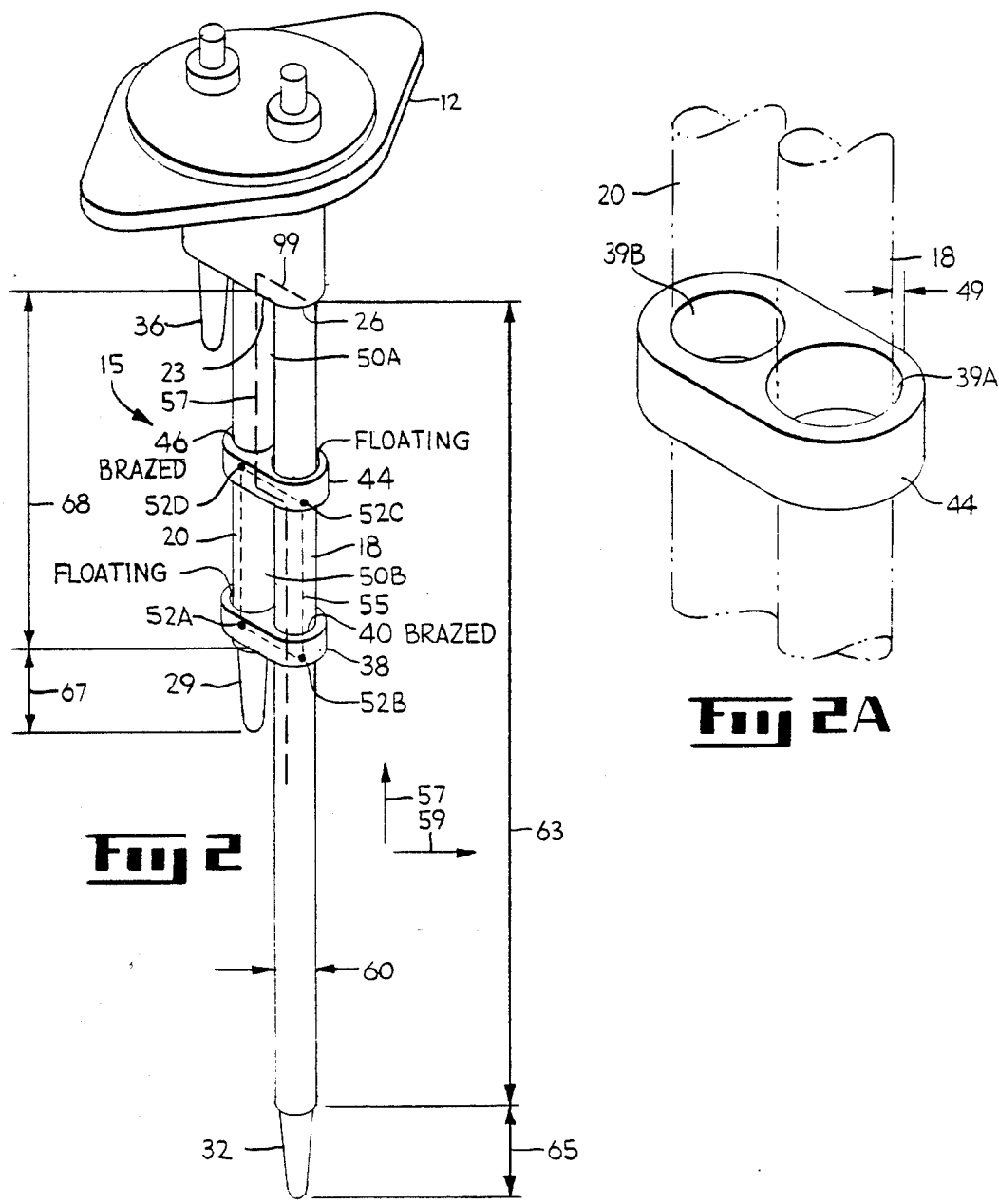
Fig 2
Fig 2A

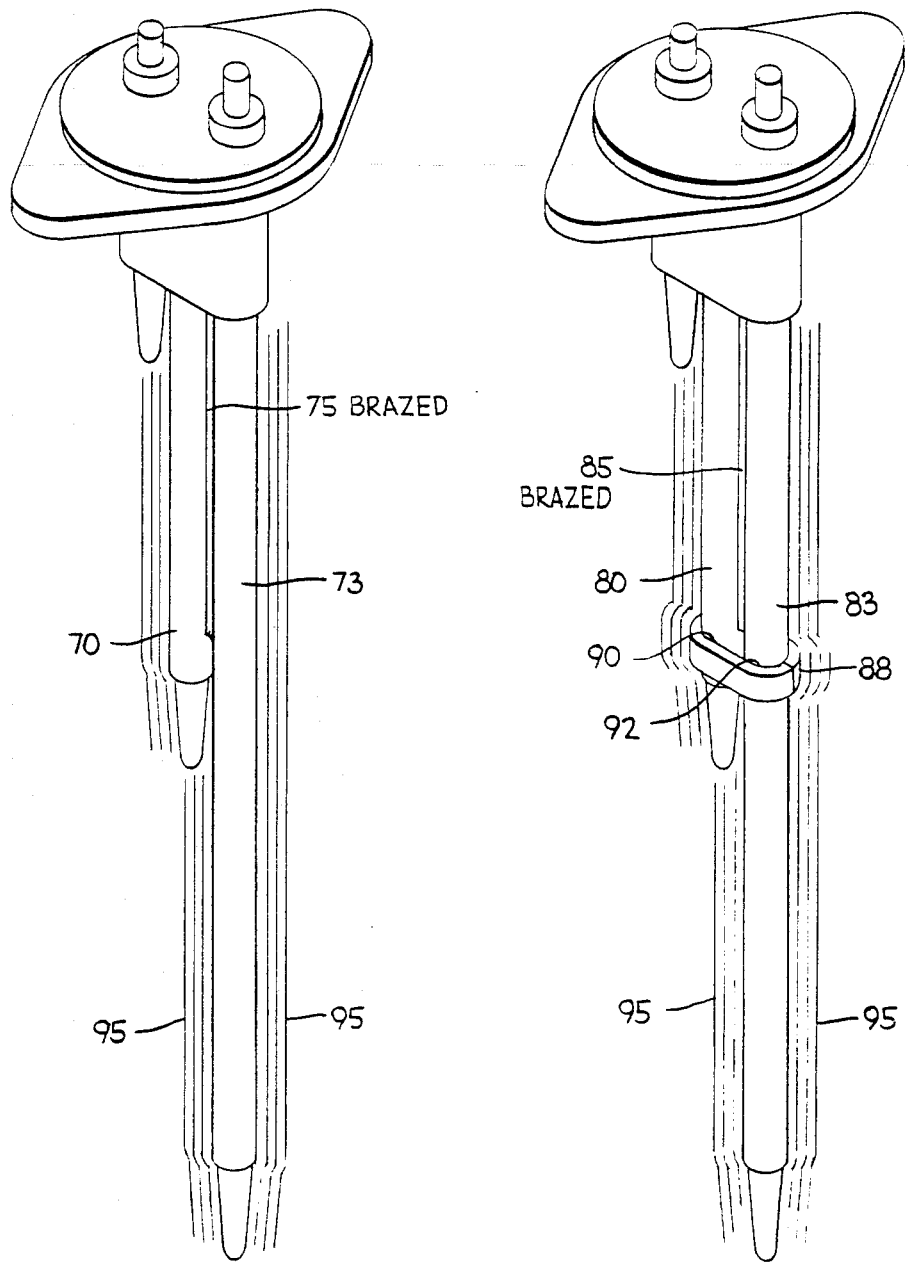

VIBRATION DAMPED PROBE

The present invention relates to the vibration damping of cantilevered probes.

BACKGROUND OF THE INVENTION

FIG. 1 illustrates a gas turbine engine 3 which provides a stream 6 of hot exhaust gases. A temperature probe 9 is used to measure the temperature of the exhaust stream 6. Typically, the probe comprises three thermocouples (not specifically shown) positioned at points 9A, 9B, and 9C which measure temperatures at three different locations in the gas stream 6. The probes are supported by cantilevers 10 (later described more fully) extending from a base 12.

The environment to which the probes are subjected is highly abusive, particularly as to vibration. Applicants have found the lifetimes of the cantilevers can be unacceptably short because of vibration-induced cracking occurring at the junction between the cantilevers and the base 12.

OBJECTS OF THE INVENTION

It is an object of the present invention to provide a new and improved apparatus for mitigating the effects of vibration on cantilevers.

It is a further object of the present invention to provide a new and improved cantilevered temperature probe for use in a gas turbine engine.

SUMMARY OF THE INVENTION

In one form of the present invention, first and second temperature sensors are supported by first and second cantilevered supports. The first support is journaled through a first fastener which is fastened to the second support. The second support is journaled through a second fastener which is fastened to the first support. Thus, each fastener is fastened to one of the supports, but floats about the other support in a journaled sleeve-type fit.

BRIEF DESCRIPTION OF THE DRAWINGS

FIG. 1 illustrates a gas turbine engine in which a cantilevered temperature probe is located.

FIG. 2 illustrates one form of the present invention.

FIG. 2A illustrates yoke 44 of FIG. 2 in greater detail.

FIGS. 3 and 4 illustrate two other types of cantilevered arrangements against which a performance test of the present invention was undertaken.

DETAILED DESCRIPTION OF THE INVENTION

FIG. 2 illustrates one form 15 of the present invention which includes a base 12 constructed of Inconel metal. Inconel is available from International Nickel Company. Two cantilevered supports or probes in the form of first and second parallel cylindrical tubes 18 and 20 are fastened to the base 12 as by brazing in regions 23 and 26. Attached to the ends of the tubes 18 and 20 are housings 29 and 32 which contain temperature sensors (not shown) taking the form of thermocouples. The tubes 18 and 20 and the housings 29 and 32 are also constructed of Inconel. A third housing 36 containing a third sensor (not shown) is also fastened to the base 12.

First and second fastening means in the forms of yokes 38 and 44 in FIG. 2 are used to fasten the cantilevers 18 and 20 together. The yokes 38 and 44 are similar in size and, as shown by second yoke 44 in FIG. 2A, contain two holes 39A and 39B of different diameters. In the case of second yoke 44, the second cantilever 20 fits through hole 39B and is brazed therein, providing a brazed joint at region 46 in FIG. 2. The first cantilever 18 is journaled through hole 39A in FIG. 2A with a clearance 49 of between 2 and 5 mils (a mil being 1/1000th inch) and no brazing.

The first cantilever 18 in FIG. 2 is fitted through the first yoke 38 and brazed at region 40. The second cantilever 20 is journaled through the first yoke 38 with a similar clearance as clearance 49 in FIG. 2A, with no brazing. The second yoke 44 is positioned approximately midway between the first yoke 38 and region 26 in FIG. 2. The cantilevers 18 and 20 are not connected to each other. That is, no brazing or other attachment is undertaken at points 50A-B, leaving a space between the cantilevers 18 and 20.

Accordingly, each yoke 38 and 40 is fastened by brazing to one of the cantilevers 18 or 20 and journaled about the other cantilever, thus providing a floating fit about the latter. In more abstract terms, the structure can be characterized as two parallel cantilevers in the form of supports 18 and 20 which are connected by two links in the form of yokes 38 and 40 such that there are four points of contact between the links and the cantilevers, namely, points 52A-D. The points 52A-D define the vertices of a four-sided polygon, in this case, dashed rectangle 55. Opposite points (points 52B and D) of the links are rigidly fastened to the cantilevers, in this case by brazing. These points are thus immovable with respect to the cantilevers with which they are associated, points 52B and D being associated with cantilevers 18 and 20, respectively. The other two opposite points (points 52A and C) are floatingly fixed to the cantilevers, in this case, by journaling with the clearances identified above. These points thus can be moved with respect to the cantilevers with which they are associated, points 52A and C being associated with cantilevers 20 and 18, respectively. They can be moved axially, in the direction of arrow 57, and laterally, in the direction of arrow 59. Thus, two paths are provided through which load can be transmitted from the base 12, through one of the cantilevers and thence to the other cantilever. A first load path runs along dashed line 57 through the fixed, brazed region 46 of yoke 44 and, if the load is sufficiently great to bend the cantilevers 18 and 20 with respect to each other such that the first cantilever 18 comes into contact with the yoke 44 through which it is journaled (that is, the clearance 39A in FIG. 2A becomes zero) then the load is transmitted to the second cantilever 20. A second load path similar to the one just described runs from the first cantilever 18, through yoke 38, and to the second cantilever 20.

The present invention was tested in competition with two alternate designs, and this test will now be described. The present invention of FIG. 2 was constructed according to the dimensions of Table I.

TABLE I

| Dimension No. | Dimension Length (Inches) |
| --- | --- |
| 60 | ¼ |
| 63 | 3⅝ |
| 65 | ⅜ |
| 67 | 13/16 |

TABLE I-continued

| Dimension No. | Dimension Length (Inches) |
| --- | --- |
| 68 | 5/16 |

The two alternate designs are shown in FIGS. 3 and 4. The first alternate design of FIG. 3 is similar to the present invention of FIG. 2 except that yokes 38 and 44 in FIG. 2 are absent and the cantilevers 70 and 73 in FIG. 3 are brazed together along junction 75. (In the present invention of FIG. 2, there is no brazing at points 50A-B.) The second alternate design is shown in FIG. 4, which is again similar to the present invention of FIG. 2, except that the cantilevers 80 and 83 are brazed together along region 85, as in the case of the first alternate design of FIG. 3. In addition, a single yoke 88 fastens the two cantilevers 80 and 83 together and, further, the yoke 88 is brazed to both cantilevers at region 90 and 92. All three designs of FIGS. 2, 3, and 4 were subjected to vibration, as shown by lines 95. It was found that the present invention withstood the vibration significantly better than the designs of FIGS. 3 and 4.

An invention has been described wherein two parallel cantilevers support temperature sensors at their ends. One cantilever is approximately half the length of the other. First and second yokes link the cantilevers together. The first yoke is fixedly attached to the first cantilever, but journaled about the second cantilever to provide a floating fit around the latter. The second link is fixed to the second cantilever, but journaled about the first cantilever to provide a similar floating fit. The journaling is illustrated in FIG. 2A, with yoke 44 representing the link which is journaled about tube 18 with the clearance 39A. The only attachments between the two cantilevers are, first, through the two yokes and, second, along the base, as shown by dashed line 99 in FIG. 2. This form of the present invention has been found to provide improved vibration resistance and ease of manufacture.

Numerous substitutions and modifications can be undertaken without departing from the true spirit and scope of the present invention as defined by the following claims.

What is claimed and desired to be secured by Letters Patent is the following:

1. An apparatus for sensing the temperature of a gas stream in a gas turbine engine, comprising:
   (a) a base;
   (b) a first elongated probe having a first length fastened to the base for supporting a first temperature sensor;
   (c) a second elongated probe having a second length fastened to the base for supporting a second temperature sensor, the second probe being approximately one-half the length of the first probe;
   (d) a first fastening means for said first and second probes through which the first probe is journaled with a clearance of approximately between 2 and 5 mils and which is fastened to the second probe; and
   (e) a second fastening means for said first and second probes through which the second probe is journaled with a clearance of approximately between 2 and 5 mils and which is fastened to the first probe, wherein the only mechanical connections existing between the first and second probes are in the first and second fastening means and in the base.

* * * * *